United States Patent [19]
Ritter

[11] Patent Number: 5,708,973
[45] Date of Patent: Jan. 13, 1998

[54] RADIO SYSTEM WITH FREQUENCY OPTIMIZATION

[75] Inventor: Gerhard Ritter, Thaining, Germany

[73] Assignee: Siemens Aktiengesellschaft, Munich, Germany

[21] Appl. No.: 281,038

[22] Filed: Jul. 27, 1994

[30] Foreign Application Priority Data

Jul. 27, 1993 [DE] Germany .................. 43 25 190.0

[51] Int. Cl.$^6$ .............. H04B 7/00; H04B 7/26; H04B 17/00; H04Q 7/00
[52] U.S. Cl. .......... 455/62; 455/34.1; 455/54.1; 455/56.1; 455/161.3
[58] Field of Search ............... 455/62, 33.1, 34.2, 455/161.3, 63, 34.1, 33.2, 53.1, 54.1, 56.1; 375/224, 308; 379/58, 59, 60; 370/95.1, 95.3, 236, 347

[56] References Cited

U.S. PATENT DOCUMENTS

| 5,203,012 | 4/1993 | Patsiokas et al. | 455/62 |
| 5,239,682 | 8/1993 | Strawcynski et al. | 455/62 |
| 5,345,597 | 9/1994 | Strawcynski et al. | 455/62 |
| 5,355,522 | 10/1994 | Demange | 455/62 |

FOREIGN PATENT DOCUMENTS 0490509  6/1992  European Pat. Off. .

OTHER PUBLICATIONS

J. Bingham, "Multicarrier Modulation for Data Transmission: An Idea Whose Time Has Come", IEEE Communications Magazine, 28(1990) May, No. 5, New York, US, pp. 5–8 and 11–14.

W. Webb, "Modulation Methods for PCNs", IEEE Communications Magazine 30(1992)Dec., No. 12, New York, US, pp. 90–95.

Primary Examiner—Wellington Chin
Assistant Examiner—Jean B. Corrielus
Attorney, Agent, or Firm—Hill, Steadman & Simpson

[57] ABSTRACT

A radio system having frequency optimization, particularly a mobile radio telephone system having base stations and subscribers (low speed mobile stations or stationary stations) is provided. In order to avoid fluctuations and interruptions of the reception level, the invention provides that the reception level and/or transmission quality of all frequencies or channels or of a part of the frequencies or channels of the channels available in a base station are constantly measured in every subscriber station (mobile station or stationary station). The measured values are communicated to the base stations wherein the frequencies or channels are allocated to the subscribers based on the overall information so that an optimally optimum frequency or transmission quality is allocated to each connection.

15 Claims, 1 Drawing Sheet

RADIO SYSTEM WITH FREQUENCY OPTIMIZATION

BACKGROUND OF THE INVENTION

1. Field of the Invention

The present invention is directed generally to a radio system having frequency optimization, and more particularly to a mobile radio telephone system with frequency optimization having base stations and subscribers (low speed mobile stations and/or stationary stations) and a method for operating same.

2. Description of the Related Art

A multi-path propagation is normally present in radio systems. A plurality of waves with different amplitude and phase thus superimpose at the reception antenna. This effect, known as Rayleigh fading, leads to pronounced location-dependent and time-dependent fluctuations of the reception level in mobile radio telephone systems. These fluctuations are especially disturbing given low speeds of the mobile station, and they can lead to longer interruptions given a stationary mobile station. Channel codings usually used can only take effect with increasing speed.

Various measures are known for fighting these effects. The most obvious solution is the use of one or more further antennas in a spatially separated arrangement. This measure is based upon the great fluctuations that arise due to the superimposition of a plurality of waves at the reception antenna. Different phases of the individual components and, thus, a different superimposition result thereby occur at the various antennas. A reduction of the fluctuation effects can be achieved by common evaluation of the signals of a plurality of antennas.

Other measures are based upon the fact that deep fades in the reception level only occur over very limited frequency ranges. Attempts are therefore made to avoid long, deep fades by utilizing a broader frequency range. These, on the one hand are frequency hopping methods such as, for example, in a GSM system, wherein every burst is transmitted on a different frequency. On the other hand, broadband transmission methods are known such as, for example, broadband TDMA or CDMA. These methods require equalizers or, respectively, RAKE receivers (RAKE stands for coherent combination of multi-path components). If a user accepts a loss of transmission capacity, a RAKE receiver can be foregone in the CDMA method. A certain averaging of the attenuation over the occupied frequency range can be achieved with the described measures in the frequency range. Further, long-lasting, deep fades in the reception level are prevented.

SUMMARY OF THE INVENTION

It is an object of the present invention to provide a radio system in which the above-described fluctuation and interruption problems do not occur, particularly given low speeds of mobile stations.

It is also an object of the present invention to provide a method for achieving frequency optimization in an apparatus of the type described.

This object is inventively achieved in a method for frequency optimizing transmissions in a mobile radio telephone system having base stations and low speed mobile subscriber stations and stationary subscriber stations. The system has a reception side and a transmission side. The method has the steps of continuously measuring a reception level of the transmissions of at least one frequency of each of a plurality of channels available to the base stations in each of the mobile subscriber stations and the stationary subscriber stations, transmitting the measured values from the subscriber stations to the base stations and the base stations allocating a connection of one of the plurality of channels having an optimum of the measured values to the subscriber stations.

The present invention also provides a frequency optimizing mobile radio telephone system having base stations and low speed mobile subscriber stations and stationary subscriber stations. The system has means for continuously measuring a reception level of transmissions between the base stations and the mobile subscriber stations and stationary subscriber stations; means for transmitting the measured values from the subscriber stations to the base stations, and the base stations further having means for allocating a connection of one of the plurality of channels having an optimum of the measured values to the subscriber stations.

The radio system of the invention shall be set forth in greater detail below with reference to the figure.

DETAILED DESCRIPTION OF THE PREFERRED EMBODIMENTS

Figure 1:
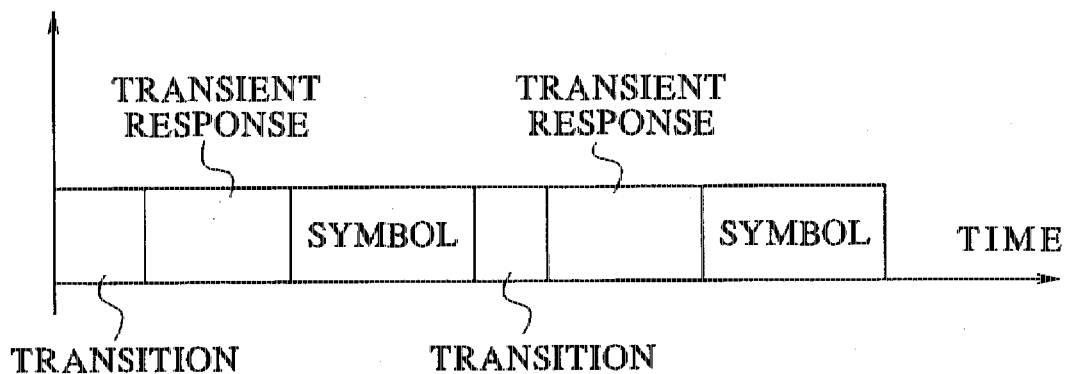
FIG. 1 illustrates the transmission of a symbol of the present invention.

The present invention has a base station and subscribers that move at low speed and subscribers that are stationary. The channels available to a base station are approximately uniformly distributed over the frequency band available. Every mobile station constantly measures the reception level of all frequencies and communicates these values to the base station. The base station then allocates the frequencies or channels to the subscribers based on the overall information so that an optimum frequency or, respectively, transmission quality is allocated to each connection. This method thus has a gain compared to known averaging methods, since no averaging over a frequency range is implemented. Rather, a frequency having an optimally high reception quality is allocated to each connection. In addition to this gain, the necessity for equalizers is generally eliminated, since the amplitude and phase distortions are lower in the proximity of a transmission maximum in the frequency range than in the region of a transmission minimum.

In frequency division duplex systems, only an optimization of the connections from the base station to the mobile station occurs via this method. No improvement is achieved for the connections from the mobile stations to the base station. For example, an antenna diversity method having a plurality of reception antennas is used to improve the latter connections. An improvement for both directions is achieved by using time-division-duplex methods, since the same frequency is then used for both connection directions of a channel.

A multi-stage phase modulation is provided as modulation in a preferred embodiment of the invention. For example, a Gray encoding can be used. The individual, transmitted words are transmitted as a specific phase value or a differential coding is performed. For transmitting a symbol, one first waits for the transient response of the channel to end before the actual evaluation begins. The amplitude and phase of the signal no longer significantly change during this evaluation. For limiting the spectrum, a transmission with respect to amplitude for the base station and a controlled phase or amplitude transmission before the waiting time for the transient response of the channel for the mobile stations can be used.

The transmission of a symbol follows a sequence shown in the figure. This, however, is only a schematic illustration that is not to scale. The transmission of a symbol is lengthened at the transmission side by the response time and additionally has the two phase transitions for limiting the spectrum of the symbols.

The disclosed type of transmission allows for the use of a FFT (fast Fourier transform) at the reception side for simultaneous evaluation of all channels of interest. As a duplex method, time-division-duplex is applied, i.e. the base station first transmits a series of symbols, what is referred to as a burst, before the mobile stations transmit a series of symbols. Thus, a time-staggered transmission alternately occurs in the two directions. The measured level values for all used frequencies or, respectively, for the n best frequencies, are cyclically transmitted from every mobile station to the base station. From this, the base station can perform an optimum frequency allocation for the mobile stations.

Figure 2:
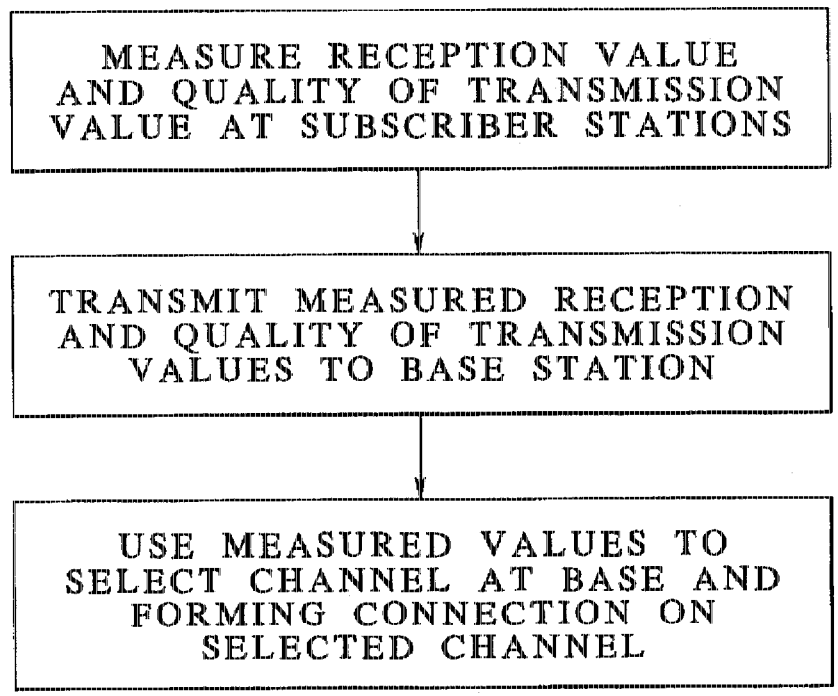
FIG. 2 is a block diagram illustration which sets forth the steps for performing the channel selection described herein.

FIG. 2 is a block diagram illustration which describes the steps employed in performing the channel selection described above. The first step is a step of measuring the reception value and quality of transmission at the subscriber stations. This is followed by a step of transmitting the measured reception and quality of transmission values to the base station and finally this is followed by a step of using the measured values to select the appropriate channel at the base station and forming a connection between the base station and the subscriber station on the selected channel as described above.

Although other modifications and changes may be suggested by those skilled in the art, it is the intention of the inventor to embody within the patent warranted hereon all changes and modifications as reasonably and properly come within the scope of his contribution to the art.

I claim:

1. A method of optimizing frequencies used for a plurality of communication channels in a mobile radio telephone system having base stations and low speed mobile subscriber stations having measuring means and stationary subscriber stations having measuring means, said system having a reception side and a transmission side, the method comprising the steps of:

continuously measuring a reception level value and a quality of transmission value of at least one frequency of each of said plurality of communication channels used by said base stations by said measuring means in each of said mobile subscriber stations and said stationary subscriber stations;

transmitting said measured reception level and quality of transmission values from said subscriber stations to said base stations;

using said measured values for selecting a channel by said base stations for allocating a connection of the selected channel of said plurality of communication channels such that the selected channel has an optimum of said measured values to said subscriber stations; and wherein a multi-stage phase modulation is used in said transmissions and the multi-stage phase modulation is further defined by using a gray coding having a transmission of individual, transmitted values as a differential coding; and providing a waiting time period for a transient response of a transmission channel before evaluating a transmission of a symbol.

2. A method according to claim 1, wherein said step of using a multi-stage phase modulation in said transmissions is further defined by using a Gray encoding for the transmission of individual values as a specific phase value.

3. A method according to claim 1, wherein said step of providing a waiting time period for a transient response is further defined by using an amplitude-wise transition for said base stations and using a controlled phase transition before said waiting time period for the transient response of a channel for said mobile subscriber stations to limit the spectrum.

4. A method according to claim 1, wherein said step of providing a waiting time period for a transient response is further defined by using an amplitude-wise transition for said base stations and using an amplitude transition before said waiting time period for the transient response of a channel for said mobile subscriber stations to limit the spectrum.

5. The method according to claim 1, further comprising the step of:

using an FFT (fast Fourier transform) for simultaneous evaluation of said plurality of channels at said reception side of said system.

6. A method according to claim 1, further comprising the step of:

using an IFFT (inverse fast Fourier transform) at said transmission side of said system to generate transmission signals for a plurality of channels.

7. A method according to claim 1, further comprising the step of:

using a time-division duplex method for said transmissions.

8. A method according to claim 1, further comprising the step of:

using a frequency-division duplex method for said transmissions.

9. A method according to claim 1, further comprising the step of:

cyclically transmitting said measured values for a plurality of frequencies to said base stations from each of said mobile subscriber stations.

10. A frequency optimizing mobile radio telephone system having base stations and low speed mobile subscriber stations and stationary subscriber stations, the system comprising:

means for continuously measuring a reception level of transmissions between said base stations and said mobile subscriber stations and stationary subscriber stations;

means for transmitting said measured values from said subscriber stations to said base stations; and said base stations further having means for selecting a channel and allocating a connection of the selected channel of said plurality of channels having an optimum of said measured values to said subscriber stations.

11. The apparatus of claim 10, further comprising a multi-stage phase modulation means for generating said transmissions.

12. The apparatus of claim 10, further comprising:

an FFT (fast Fourier transform) means for simultaneously evaluating said plurality of channels.

13. The apparatus of claim 10, further comprising:
an IFFT (inverse fast Fourier transform) means for generating transmission signals for a plurality of channels.

14. The apparatus of claim 10, further comprising:
means for cyclically transmitting said measured values for a plurality of frequencies to said base stations from each of said mobile subscriber stations.

15. A method of optimizing the frequencies used for communication channels in a mobile radio telephone system having one or more base stations and low speed mobile subscriber stations and stationary subscriber stations, the method comprising the steps of:

continuously measuring the received level and the quality of transmission of all of the frequencies in use by an affiliated base station in each of said mobile subscriber stations and said stationary subscriber stations;

transmitting said measured received level and quality of transmission from said subscriber stations to said base station; and using said base station to allocate communication channels for each subscriber station based upon said measured received level and quality of transmission such that the communication channels use an optimum frequency for the communication with each of said subscribers.

* * * * *